United States Patent
Winiarski

(10) Patent No.: US 10,545,957 B1
(45) Date of Patent: Jan. 28, 2020

(54) METHOD AND SYSTEM FOR IMPLEMENTING A BATCH STORED PROCEDURE TESTING TOOL

(71) Applicant: JPMorgan Chase Bank, N.A., New York, NY (US)

(72) Inventor: Robert A. Winiarski, Valrico, FL (US)

(73) Assignee: JPMorgan Chase Bank, N.A., New York, NY (US)

( * ) Notice: Subject to any disclaimer, the term of this patent is extended or adjusted under 35 U.S.C. 154(b) by 332 days.

(21) Appl. No.: 15/643,569

(22) Filed: Jul. 7, 2017

Related U.S. Application Data

(60) Provisional application No. 62/359,774, filed on Jul. 8, 2016.

(51) Int. Cl.
*G06F 16/242* (2019.01)
*G06F 16/248* (2019.01)

(52) U.S. Cl.
CPC ........ *G06F 16/2443* (2019.01); *G06F 16/248* (2019.01)

(58) Field of Classification Search
CPC ... G06F 16/2443; G06F 16/951; G06F 16/248
See application file for complete search history.

(56) References Cited

U.S. PATENT DOCUMENTS

| | | | | |
|---|---|---|---|---|
| 9,690,577 B1* | 6/2017 | Crew | .................. | G06F 11/3672 |
| 2005/0256834 A1* | 11/2005 | Millington | .......... | G06F 16/9535 |
| 2006/0004745 A1* | 1/2006 | Kuhn | ..................... | G16H 15/00 |
| 2007/0208695 A1* | 9/2007 | Burger | ............. | G06F 16/24553 |
| 2007/0282837 A1* | 12/2007 | Klein | ................. | G06F 11/3419 |
| 2008/0098033 A1* | 4/2008 | Farrar | ................... | G06F 16/252 |
| 2011/0113054 A1* | 5/2011 | McLean | ............. | G06F 16/8358 707/769 |
| 2012/0198416 A1* | 8/2012 | Sirr | .......................... | G06F 8/35 717/104 |
| 2013/0138626 A1* | 5/2013 | Delafranier | ......... | G06F 16/2453 707/713 |
| 2013/0204450 A1* | 8/2013 | Kagan | .................... | H04L 67/06 700/291 |
| 2016/0283584 A1* | 9/2016 | Dubost | .............. | G06F 16/2322 |

* cited by examiner

*Primary Examiner* — James Trujillo
*Assistant Examiner* — Michal Bogacki
(74) *Attorney, Agent, or Firm* — Hunton Andrews Kurth LLP

(57) ABSTRACT

The invention relates to a Batch Stored Procedure Tool. An embodiment of the present invention may read a control file containing the name of a stored procedure to be tested, along with its corresponding input parameters and other key data. An embodiment of the present invention may then call the specified stored procedure using a dynamically-built parameter list. The system may then display or generate input/output parameter values. If the stored procedure in question has a result set(s), the system may fetch the desired number of rows from each result set and display the columns as well.

20 Claims, 4 Drawing Sheets

METHOD AND SYSTEM FOR IMPLEMENTING A BATCH STORED PROCEDURE TESTING TOOL

CROSS REFERENCE TO RELATED APPLICATIONS

The application claims priority to U.S. Provisional Application 62/359,774, filed Jul. 8, 2016, the contents of which are incorporated herein in its entirety.

FIELD OF THE INVENTION

The present invention generally relates to testing stored procedures and more specifically, to a batch stored procedure testing tool.

BACKGROUND OF THE INVENTION

Testing procedures is generally a labor-intensive and time-consuming task. Current tools require an extensive manual input process. For instance, users are required to enter all input parameters each time a test is run. Also, current tools do not provide a mechanism to save multiple versions of input parameters for re-use. Accordingly, if even a minor change is made, the entire process has been to be processed from scratch.

These and other drawbacks exist.

SUMMARY OF THE INVENTION

Accordingly, one aspect of the invention is to address one or more of the drawbacks set forth above. According to an embodiment of the present invention, a computer implemented system that implements a batch stored procedure tool comprises: a memory component that stores control file data; an interactive interface that receives a batch input; a processor, coupled to the memory component and the interactive interface, the processor configured to perform the steps comprising: access a control file from the memory component; identify an identifier associated with a stored procedure, wherein the stored procedure represents a compiled program that executes one or more SQL statements and is stored in a server; using the identifier, dynamically build a parameter list associated with the stored procedure; execute the stored procedure using the parameter list; identify corresponding one or more result sets; and display, via the interactive interface, stored procedure results and the one or more result sets.

According to another embodiment of the present invention, a computer implemented method comprising the steps of: accessing a control file from the memory component, wherein the memory component that stores control file data; identifying, via a processor, an identifier associated with a stored procedure, wherein the stored procedure represents a compiled program that executes one or more SQL statements and is stored in a server; using the identifier, dynamically building a parameter list associated with the stored procedure; executing, via a processor, the stored procedure using the parameter list; identifying corresponding one or more result sets; and displaying, via an interactive interface, stored procedure results and the one or more result sets, wherein the processor is coupled to the memory component and the interactive interface.

The computer implemented system, method and medium described herein provide unique advantages to entities, organizations and other users (e.g., developers, quality assurance teams, testing departments, etc.), according to various embodiments of the invention. The innovative system and method facilitates the process of testing or executing stored procedures through a batch stored procedure tool. The tool is further self-documenting and automatically builds an audit trail that provides all the parameters used by the stored procedure along with their corresponding values. The innovations of the batch stored procedure tool realizes efficiencies over current systems and methods. These and other advantages will be described more fully in the following detailed description.

BRIEF DESCRIPTION OF THE DRAWINGS

In order to facilitate a fuller understanding of the present inventions, reference is now made to the appended drawings. These drawings should not be construed as limiting the present inventions, but are intended to be exemplary only.

DESCRIPTION OF EMBODIMENTS OF THE INVENTION

Figure 1:
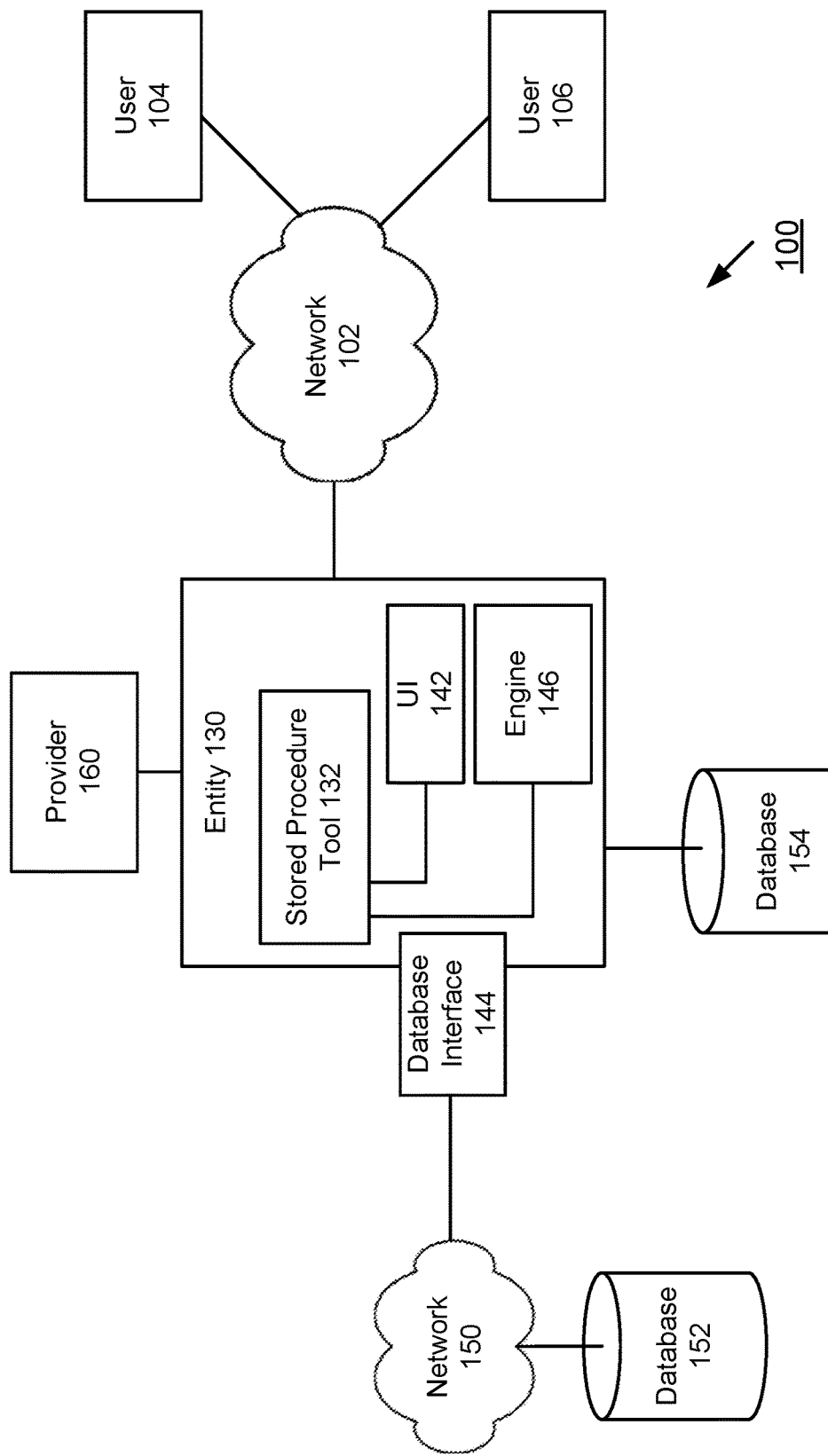
FIG. 1 is an exemplary system diagram for implementing a batch stored procedure tool, according to an embodiment of the present invention.

The following description is intended to convey an understanding of the present invention by providing specific embodiments and details. It is understood, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending upon specific design and other needs.

An embodiment of the present invention is directed to a Batch Stored Procedure Tool that automates stored procedure testing by processing a control file. The control file may contain a set of test cases. The control file may be specific to a team, such as Application Development teams or Quality Assurance teams. For example, each test case may contain the name (or identifier) of the stored procedures to test along with corresponding input parameters. The control file may contain as many different test cases as desired for any number of stored procedures. Also, the control file may be stored on a mainframe permanently for re-use.

A stored procedure may represent a specialized program. A stored procedure may represent a compiled program that can execute SQL statements and is stored at a local or remote database server For example, an entity may manage a customer information facility that provides data warehousing, where many different applications call various stored procedures. For example, an application may execute a stored procedure to retrieve a name and an address for a set of accounts by passing account identifiers. According to an exemplary illustration, the entity may execute 50, 60, 70 stored procedures on thousands and thousands of test cases.

For example, a stored procedure may be invoked from an application program or from the command line processor. A single call to a stored procedure from a client application may access the database at the server several times. A typical stored procedure may contain two or more SQL statements and some manipulative or logical processing in a host language or SQL procedure statements. Stored procedures may be called from other applications or from the command line.

According to an embodiment of the present invention, the Tool may initiate a read of a control file. The control file may be received electronically as an input from a source, as a data feed or other transmission. For each test case, the system may call an appropriate stored procedure using the specified parameters. The program may display the test result output in addition to any available result sets, e.g., DB2 Result Sets, that the stored procedure creates. The results may then be saved by the user for documentation and/or auditing purposes, etc. Also, the results may be exported to another application, communicated to recipients, programs, systems, and further available for download by a user. Result sets may represent information from different tables, sources, etc. Also, result sets may represent results of a stored procedure in a particular format and may be further filtered or processed. For example, the stored procedure may process the result sets and display the information in the audit trail.

Current systems require a user to manually provide details concerning a procedure to be tested. And, if a stored procedure is changed or updated, the stored procedure would need to be recompiled with current systems. With an embodiment of the present invention, a user does not need have a priori knowledge of details concerning the stored procedure to be tested. Upon reading the control file, the Tool may retrieve an identifier (e.g., name, number, etc.) of the stored procedure to test. The Tool may then use the stored procedure's identifier to access remote system tables to retrieve associated information, such as properties and parameters, of the stored procedure. An embodiment of the present invention may use the information to process the rest of the values in the test case and then issue the call to the stored procedure. Because the Tool of an embodiment of the present invention functions dynamically, the Tool does not need to be recompiled in order to test a new stored procedure or to test changes to an existing stored procedure. The Tool may easily test different versions of the same stored procedure that may exist in different regions (e.g., development, QA, production, etc.).

FIG. 1 is an exemplary system diagram for implementing a Batch Stored Procedure Tool, according to an embodiment of the present invention. As illustrated in FIG. 1, Network 102 may be communicatively coupled with one or more data devices including, for example, computing devices associated with end users, represented by User 104, 106. Such devices may include mobile devices, including mobile phones, smart devices, etc. Entity 130 may include a Stored Procedure Tool 132 that automates and facilitates execution and testing of stored procedures in accordance with the various embodiments of the present invention. Stored Procedure Tool 132 may also incorporate modules and other functions, such as User Interface 142, Database Interface 144 and Engine 146. These modules are exemplary and illustrative, Stored Procedure Tool 132 may interact with additional modules, a combination of the modules described and/or less modules than illustrated. While a single illustrative block, module or component is shown, these illustrative blocks, modules or components may be multiplied for various applications or different application environments. In addition, the modules or components may be further combined into a consolidated unit. The modules and/or components may be further duplicated, combined and/or separated across multiple systems at local and/or remote locations. Other architectures may be realized.

Stored procedures may be stored and maintained by Databases 152, 154. For example, Database 152 may maintain stored procedures and corresponding parameters for each stored procedure at a remote location, accessible by Network 150. Database 152 may receive updates, revisions, requests and/or other actions on the data stored via Database Interface 134. The updates may be automatically implemented from various sources, applications, and systems. Also, Databases 152, 154 may also store and maintain output data in various formats as well as reports, performance data, etc. The Stored Procedure Tool described herein may be provided by Entity 130 and/or a third party provider, represented by 160, where Provider 160 may operate with Entity 130.

The system 100 of FIG. 1 may be implemented in a variety of ways. Architecture within system 100 may be implemented as hardware components (e.g., module) within one or more network elements. It should also be appreciated that architecture within system 100 may be implemented in computer executable software (e.g., on a tangible, non-transitory computer-readable medium) located within one or more network elements. Module functionality of architecture within system 100 may be located on a single device or distributed across a plurality of devices including one or more centralized servers and one or more mobile units or end user devices. The architecture depicted in system 100 is meant to be exemplary and non-limiting. For example, while connections and relationships between the elements of system 100 is depicted, it should be appreciated that other connections and relationships are possible. The system 100 described below may be used to implement the various methods herein, by way of example. Various elements of the system 100 may be referenced in explaining the exemplary methods described herein.

Network 102, 150 may be a wireless network, a wired network or any combination of wireless network and wired network. For example, Network 102, 150 may include one or more of an Internet network, a satellite network, a wide area network ("WAN"), a local area network ("LAN"), an ad hoc network, a Global System for Mobile Communication ("GSM"), a Personal Communication Service ("PCS"), a Personal Area Network ("PAN"), D-AMPS, Wi-Fi, Fixed Wireless Data, IEEE 802.11a, 802.11b, 802.15.1, 802.11g, 802.11n, 802.11ac, or any other wired or wireless network for transmitting or receiving a data signal. Also, Network 102, 150 may support an Internet network, a wireless communication network, a cellular network, Bluetooth, or the like, or any combination thereof. Network 102, 150 may further include one, or any number of the exemplary types of networks mentioned above operating as a stand-alone network or in cooperation with each other. Network 102, 150 may utilize one or more protocols of one or more network elements to which it is communicatively coupled. Network 102, 150 may translate to or from other protocols to one or more protocols of network devices. Although Network 102 and 150 are each depicted as one network for simplicity, it should be appreciated that according to one or more embodiments, Network 102, 150 may comprise a plurality of interconnected networks, such as, for example, a service provider network, the Internet, a cellular network, corporate networks, or even home networks, or any of the types of networks mentioned above.

Data may be transmitted and received via Network 102, 150 utilizing a standard networking protocol or a standard telecommunications protocol. For example, data may be transmitted using Session Initiation Protocol ("SIP"), Wireless Application Protocol ("WAP"), Multimedia Messaging Service ("MMS"), Enhanced Messaging Service ("EMS"), Short Message Service ("SMS"), Global System for Mobile Communications ("GSM") based systems, Code Division Multiple Access ("CDMA") based systems, Transmission Control Protocol/Internet Protocols ("TCP/IP"), hypertext transfer protocol ("HTTP"), hypertext transfer protocol secure ("HTTPS"), real time streaming protocol ("RTSP"), or other protocols and systems suitable for transmitting and receiving data. Data may be transmitted and received wirelessly or in some cases may utilize cabled network or telecom connections such as an Ethernet RJ45/Category 5 Ethernet connection, a fiber connection, a cable connection or other wired network connection.

While FIG. 1 illustrates individual devices or components, it should be appreciated that there may be several of such devices to carry out the various exemplary embodiments. Entity 130 may communicate using any mobile or computing device, such as a laptop computer, a personal digital assistant, a smartphone, a smartwatch, smart glasses, other wearables or other computing devices capable of sending or receiving network signals. User devices may have an application installed that is associated with Entity 130.

Entity 130 may be communicatively coupled to Databases 152, 154, via Database Interface 134. These storage components may include any suitable data structure to maintain the information and allow access and retrieval of the information. For example, the storage components may keep the data in an organized fashion and may be an Oracle database, a Microsoft SQL Server database, a DB2 database, a MySQL database, a Sybase database, an object oriented database, a hierarchical database, a flat database, and/or another type of database as may be known in the art to store and organize data as described herein.

The storage may be local, remote, or a combination. The storage components may utilize a redundant array of disks (RAID), striped disks, hot spare disks, tape, disk, or other computer accessible storage. In one or more embodiments, the storage may be a storage area network (SAN), an internet small computer systems interface (iSCSI) SAN, a Fiber Channel SAN, a common Internet File System (CIFS), network attached storage (NAS), or a network file system (NFS). The storage components may have back-up capability built-in. Communications with the storage components may be over a network, such as Network 102, or communications may involve a direct connection between the various storage components and Entity 130, as depicted in FIG. 1. The storage components may also represent cloud or other network based storage.

Figure 2:
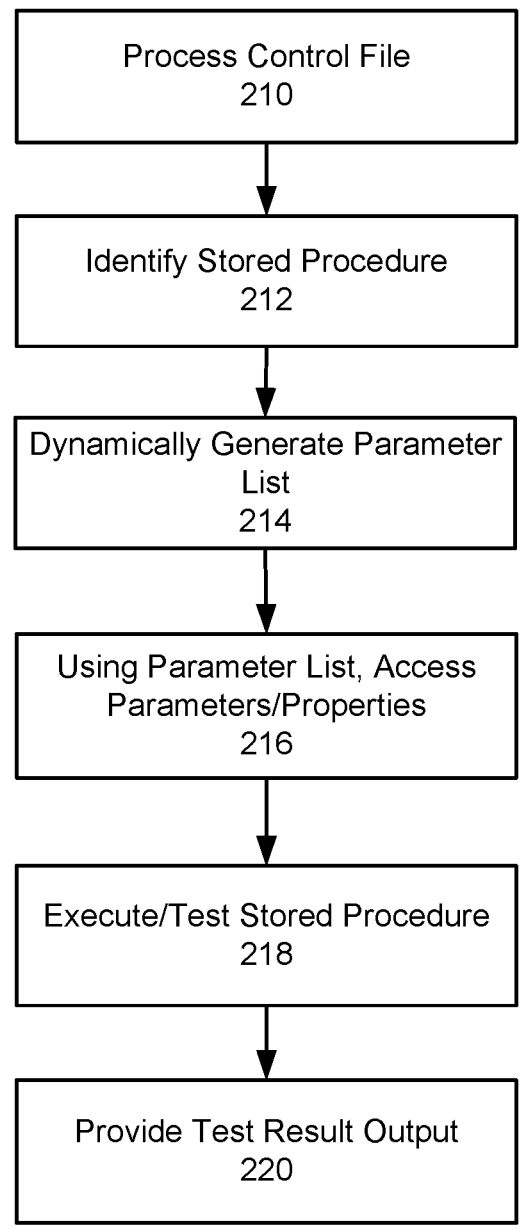
FIG. 2 is an exemplary flowchart for implementing a batch stored procedure tool, according to an embodiment of the present invention.

FIG. 2 is an exemplary flowchart for implementing a Batch Stored Procedure Tool, according to an embodiment of the present invention. An embodiment of the present invention is directed to testing stored procedures through a batch process. At step 210, the system receives and processes a control file containing stored procedures to be tested. At step 212, the system retrieves an identifier associated with a stored procedure to be tested. At step 214, the system dynamically generates a parameter list corresponding to the identifier. At step 216, using the parameter list, the system accesses associated parameter values, properties and/or other key data. At step 218, the system may call, execute and/or test the specified stored procedure using the dynamically-built parameter list. At step 220, the system provides an output of the stored procedure with the input/output parameter values in its audit trail. The order illustrated in FIG. 2 is merely exemplary. While the process of FIG. 2 illustrates certain steps performed in a particular order, it should be understood that the embodiments of the present invention may be practiced by adding one or more steps to the processes, omitting steps within the processes and/or altering the order in which one or more steps are performed. The details of the steps are described below.

At step 210, the system receives and processes a control file containing stored procedures to be tested. The control file may contain a list of stored procedures for batch testing and/or other specific information for the test or series of tests. An embodiment of the present invention may put multiple test cases for any number of stored procedures into a single control file. An additional benefit of doing this in batch is that a tool set for mainframe development (e.g., ISPF (Interactive System Productivity Facility)) provides the ability to save the output of the job to a dataset. This is useful for documentation purposes. Also, an embodiment of the present invention may also process input data in various formats, including XML and other formats that use delimiting tags.

At step 212, the system retrieves an identifier associated with a stored procedure to be tested. For example, the system may recognize an identifier associated with the stored procedure.

At step 214, the system dynamically generates a parameter list corresponding to the identifier. The parameter list may include parameters such as request type, account number, response type, etc.

At step 216, using the parameter list, the system accesses associated parameter values, properties and/or other key data. The system may identify values, including default values and/or user provided values. Also, the values may be generated or calculated in real-time by the Tool.

At step 218, the system may call, execute and/or test the specified stored procedure using the dynamically-built parameter list. Stored procedures may include data retrieval functions (e.g., retrieve name and address, etc.) as well as other functions relating to payment information, Swift addresses, integrated voice response (IVR), accounts (e.g., DDA, etc.), and others.

An exemplary stored procedure (CIFSP001) may represent a utility stored procedure that is capable of creating an SQL statement to perform one of the basic database functions. For example, it may issue an Insert, Update, Delete, or Select action against any DB2 table in the CIF application based on input parameter values provided by the calling program.

Another exemplary stored procedure (CIFSP011) may provide account-level information from a set of core master tables in a result set that is returned to the calling program. The data may be accessed by providing an Industry Identifier value from a pre-defined list along with an account-specific identifier. For example, the Industry Identifier "DDA" (Demand Deposit Account) along with an actual account number may be provided by the calling program. This permits the SQL statements contained in the stored procedure to extract and return the pertinent data.

Another exemplary stored procedure (CIFSP016) may provide account-level information from a set of core master tables in a result set that is returned to the calling program. An aspect of this stored procedure is that it is used to provide Dodd-Frank disclosure information to customers who are sending international wire payments.

Yet another exemplary stored procedure (CIFSP027) may provide key Financial Entity information to a partner application, Global Funds Processor (GFP). Instead of returning a result set, it may returns all the necessary data in an output parameter that GFP loads into its memory during its start-of-day process.

A suite of stored procedures used by an IVR team (Integrated Voice Response) may provide a variety of account features, such as providing account investigation contacts, determining if users are permitted to initiate and/or confirm payments by phone, and reset user PINs.

At step 220, the system provides an output of the stored procedure with the input/output parameter values in its audit trail. For example, a stored procedure may expect a particular output in a format, such as an account number with 17 digits. The output may include various formats that may be displayed, stored, exported, communicated, etc. The formats may include chart, interactive graphic, text file, document, etc. In addition, the Tool may provide an export of the results to another application, system, target, etc. The Tool may also notify an recipient, team or group of recipients that result sets are available at a location, via link, etc. In addition, the stored procedure may process the result sets and display the information in an audit trail or other report.

The system may determine if one or more result sets are expected. If yes, the system may fetch a predetermined set of rows from the result sets. If the stored procedure in question has a result set(s), the system may display the attributes of the result set in the audit trail and/or fetch and provide a user-defined number of rows from each result set.

Conventional testing systems are limited to a single test case at a time. An embodiment of the present invention provides the option to put multiple test cases into one control file. Accordingly, this would allow the system to execute thousands and thousands of test cases by running the test just once. Through an embodiment of the present invention, the user may easily create a portfolio of test cases that are available for re-use in future releases. The added benefit of doing this in batch is that ISPF provides the ability to save the output of the job to a dataset or other target location.

Figure 3:
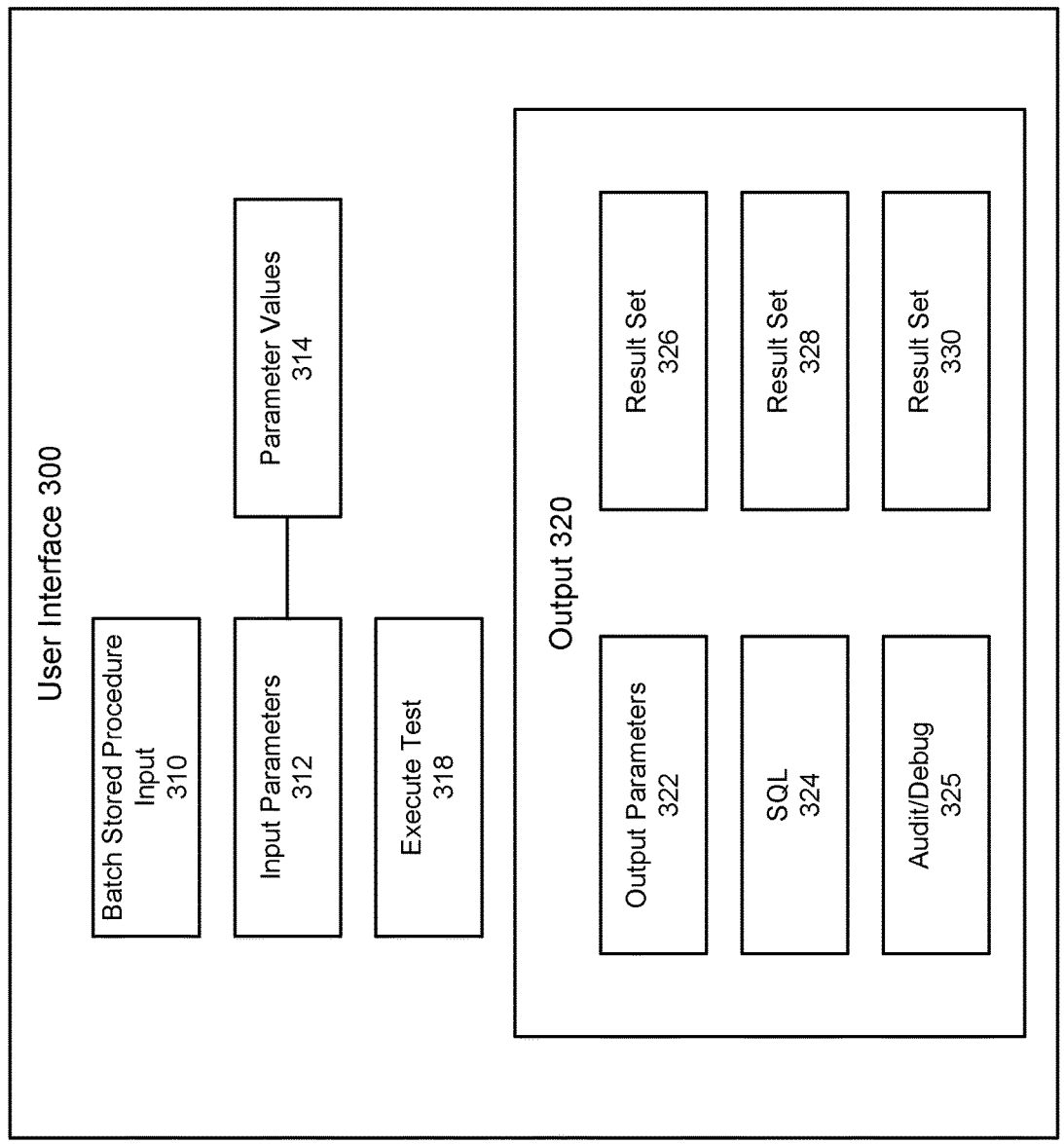
FIG. 3 is an exemplary illustration of a batch stored procedure tool interface, according to an embodiment of the present invention.

FIG. 3 is an exemplary illustration of a batch stored procedure tool interface, according to an embodiment of the present invention. An embodiment of the present invention may read a control file containing the name of a stored procedure to be tested, along with its corresponding input parameters and other key data. An embodiment of the present invention may then call the specified stored procedure using a dynamically-built parameter list. The system may then display or generate input/output parameter values. If the stored procedure in question has a result set(s), the system may fetch the desired number of rows from each result set and display the columns as well.

User Interface 300 may be accessible via a mobile device, desktop device and other computing device, processor or system. An embodiment of the present invention is directed to a web front-end that facilitates creation and submission of a test case in batch. User Interface 300 may include various modules that perform batch stored procedure testing functionality. For example, a stored procedure may be identified at Input 310. A user may select a stored procedure from a drop down window or other interface. The drop down window may provide a listing of available stored procedures by identifier, function and/or other characteristic. For example, the user may request to execute a stored procedure for retrieving name and address information. Input 310 may also receive a portfolio of stored procedures. For example, the input may be received electronically from a source in the form of an electronic file. Based on the stored procedure, input parameters may be identified and displayed. For example, the Tool may provide the input parameters associated with the stored procedure in their proper order, at 312. Corresponding parameter values may be provided at 314. A test may be executed at 318. The test output may be provided at Output 320. In this example, Output 320 provides output parameters at 322. Other features may include details concerning SQL 324, such as SQL communication area, etc. Also, the output may provide an Audit/Debug feature 325 that automatically builds an audit trail that provides the parameters used by the stored procedure along with their corresponding values. The Audit/Debug feature 325 also provides debug functionality for the stored procedure.

If Result Sets are available, those outputs are displayed at 326, 328, 330. If additional result sets are identified, then additional result sets may be displayed. Result Sets may be represented as a chart that shows the attributes of each column returned in the result set. Providing this chart to another application is a great validation tool early in development. Other values/features may be displayed. These modules are exemplary and illustrative, the User Interface may include additional modules, a combination of the modules described and/or less modules than illustrated. While a single illustrative block, module or component is shown, these illustrative blocks, modules or components may be multiplied for various applications or different application environments. In addition, the modules or components may be further combined into a consolidated unit. The modules and/or components may be further duplicated, combined and/or separated across multiple systems at local and/or remote locations. Other architectures may be realized.

Figure 4:
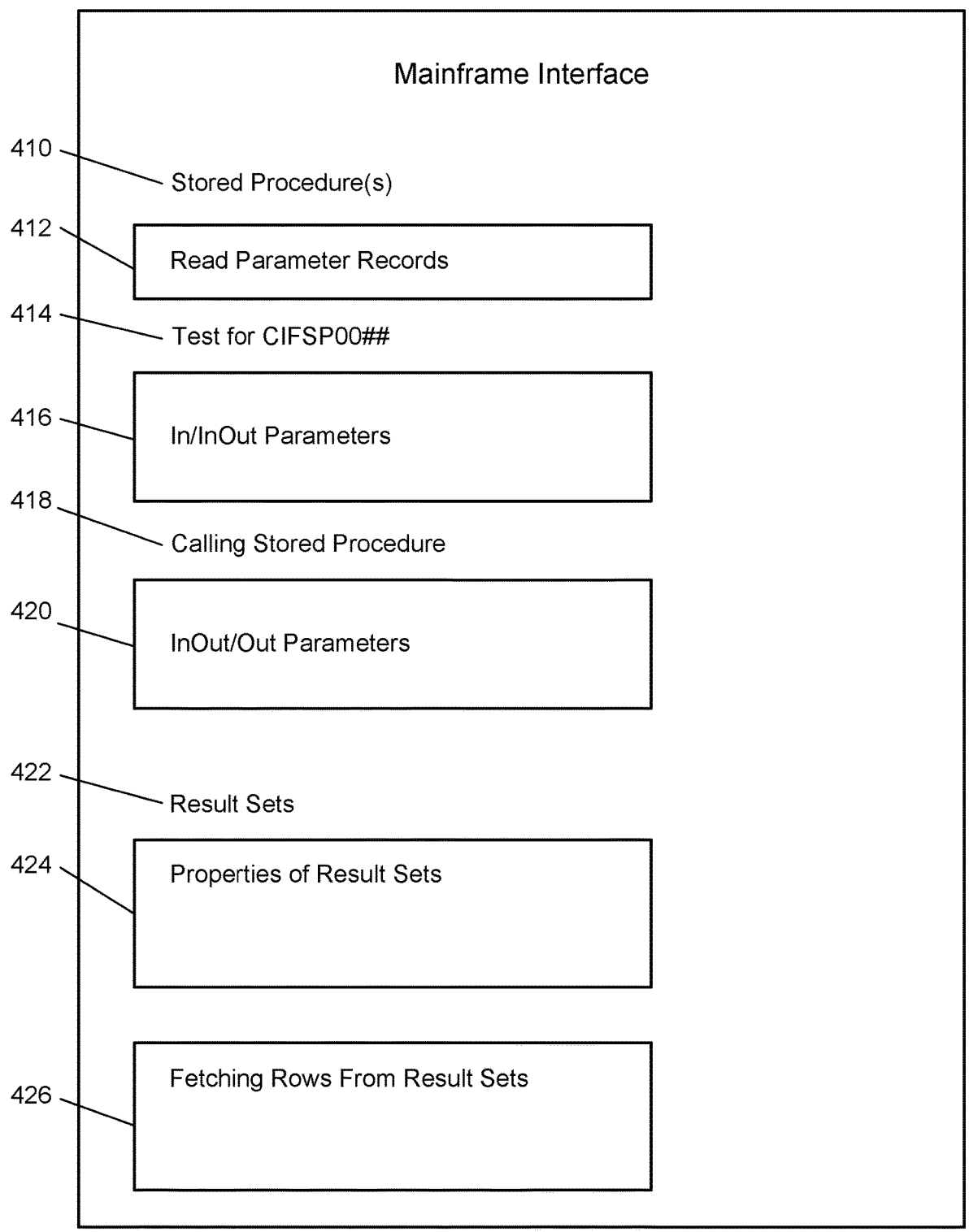
FIG. 4 is an exemplary mainframe illustration of a batch stored procedure tool interface, according to an embodiment of the present invention.

FIG. 4 is an exemplary mainframe illustration of a batch stored procedure tool interface, according to an embodiment of the present invention. An embodiment of the present invention may be implemented in a mainframe. As shown in FIG. 4, the mainframe may identify one or more stored procedures to be tested at 410. In this example, a user may select or identify a stored procedure CIFSP112, at 410. The Tool may then retrieve or access a corresponding set of input parameters that may be displayed at 412. The Tool may also determine whether there are associated result sets for retrieval, at 422. The Tool may recognize that if result sets are available, a predetermined number of rows (or other subset) may be retrieved. In this example, the Tool may fetch up to 20 rows from the result set(s).

Associated values for the parameters may be provided at 416. In the case of the CIFSP112 example above, the PARMVALUE parameter values correspond to the following:

| | |
|---|---|
| REQUEST_TYPE | CHAR(01) |
| FEN_ID | CHAR(02) |
| BRCH_ID | CHAR(03) |
| ACCT_NUM | CHAR(17) |
| RESP_TYPE | CHAR(04) |

If the user desires, the input parameters may be split across multiple PARMVALUE cards. Upon execution of the stored procedure at 418, the Tool may provide an output. The Tool may display output parameters, responsive to the input parameters, at 420.

The Tool may determine whether the stored procedure has corresponding result sets. The Tool may display properties of result sets and fetch rows from the result sets. For example, in a mainframe example, the output may include properties of R/S 00001:REQ_TYPE_I_CSR, at 424, and fetching rows from R/S 00001:REQ_TYPE_I_CSR, at 426. The Tool may then process each result set and fetch the specified number of rows. In this case, the result set is named "REQ_TYPE_I_CSR" (this is its name in the stored procedure). The columns from each fetched row may be displayed. The columns may include column number (e.g., 001, 002, 003, 004, etc.), column name (e.g., AIC_Contract_NM; AIC_Priority, AIC_Pri_Ph_Intl_CD, etc.), SQL type (e.g., 452, 500, 452, etc.), description (e.g., Char, SmallInt, etc.), length (e.g., 35, 2, 5, etc.), nullable (e.g., N, Y), etc. The column names may represent the actual names from the stored procedure.

As the system processes each column from the row it fetched, it may format the data based on its DB2 data type. For example, if the result set were to contain a column defined as DECIMAL(13,2), then the program may display it as either positive or negative and with the decimal point in the right place. Other variations may be implemented.

An embodiment of the present invention may process multiple results sets from one stored procedure. In this example, the Tool may test a stored procedure that will return multiple result sets. The stored procedure may be identified at 410. Using the stored procedure identifier, the Tool may identify input parameters to the stored procedure in their proper order, at 412. For CIFSP003, the PARM-VALUE parameter values correspond to the following:

| | |
|---|---|
| SYSTEM_ID | CHAR(01) |
| STORPROC_NAME | CHAR(08) |
| QUERY_ID | CHAR(10) |
| QUERY_PARSING | CHAR(20) |
| QUERY_VALUES | VARCHAR(1000) |
| ROWS_TO_FETCH | INTEGER |
| RESP_TYPE | CHAR(04) |

For example, the Tool may test a stored procedure, CIFSP003, as identified at 414. At 416, the IN/INOUT parameters may be displayed before calling the stored procedure. Such parameters and values may include:

| | |
|---|---|
| SYSTEM_ID | C |
| STORPROC_NAME | CIFSP003 |
| QUERY_ID | IDTST01000 |
| QUERY_PARSING | |
| QUERY_VALUES | UAM_DESCRIPTION= UNDEFINED:TBL_CODE=ATN: |
| ROWS_TO_FETCH | 00000000 |
| RESP_TYPE | NORM |

The Tool may call stored procedure CIFSP003, at 418, and recognize that three separate result sets are expected. The Tool may fetch up to 10 rows from the result set(s), if available.

At 420, the INOUT/OUT parameters may be displayed after calling the stored procedure. Such parameters and values may include:

| | |
|---|---|
| RESP_TYPE | 0000 |
| RESP_RS01_COUNT | +0000000044 |
| RESP_RS02_COUNT | +0000000473 |
| RESP_RS03_COUNT | +0000000019 |
| RESP_RS04_COUNT | −0000000001 |
| RESP_RS05_COUNT | −0000000001 |
| RESP_RS06_COUNT | −0000000001 |
| RESP_RS07_COUNT | −0000000001 |
| RESP_RS08_COUNT | −0000000001 |
| RESP_RS09_COUNT | −0000000001 |
| RESP_RS010_COUNT | −0000000001 |
| RESP_SQLCD | +0000000000 |
| RESP_SQLCA | |
| RESP_TXT | |

As shown above, the values indicate how many records are available for each result set (RESP_RS##) parameter. A value that is greater than zero indicates the number of rows contained in the result set. A value of zero indicates that the result set contains no rows, or that the calling application did not request a count to be returned for that result set. A negative value indicates that the result set was not in use.

Each result set may be displayed at 422, along with properties at 424 and rows (or other subset) at 426.

As explained above, input parameter values that are passed into the stored procedure may be displayed at 416. Output parameter values that are returned by the stored procedure may be shown at 420. Also shown are the total number of rows that exist in each of the three result sets. The calling application may make use of these counts (RESP_RS01_COUNT thru RESP_RS10_COUNT) to know how many rows to expect in each result set. These output parameter counters may be frequently evaluated before the calling program begins to fetch rows from the result sets.

An embodiment of the present invention may provide details concerning the returned result sets. A run-time parameter option may request space to handle two result sets as a default setting. For example, a test of stored procedure CIFSP003 may return three result sets. In this example, the Tool detected that three result sets are being returned by the stored procedure and it issued a command to dynamically increase the space needed to handle the additional result set.

Result Set details may include PROPERTIES OF R/S 00001: DYNAMIC_CSR01 and Fetching Rows From R/S 00001: DYNAMIC_DSR01.

At 424, for properties of R/S 00001: DYNAMIC_CSR01, a chart (or other graphic) may demonstrate attributes of each column returned in the result set. This particular result set may have a set number of columns, e.g., four columns. The column names and other useful properties may be displayed. The columns may include column number (e.g., 001, 002, 003, 004), column name (e.g., UAM_FEN_ID, UAM_ID, UAM_Label, and UAM_Description), SQL type (e.g., 452, 500, 452, 452), description (e.g., Char, SmallInt, Char, Char), length (e.g., 2, 2, 2, 55), nullable (e.g., N, Y), etc. Providing this chart to another application is a useful validation tool early in development.

At 426, for fetching rows from R/S 00001: DYNAMIC_CSR01, the Tool may identify that the stored procedure has result sets. The Tool may then process each result set and fetch the specified number of rows. In this case, the first result set is named "DYNAMIC_CSR01" (this is its name in the stored procedure). The columns from each fetched row may be displayed. As the system processes each column from the row it fetched, it may format the data based on its DB2 data type. For example, if the result set were to contain a column defined as DECIMAL(13,2), then the program would display it as either positive or negative and with the decimal point in the right place.

There may be more rows in the result set, but the PARMSTART card contained an option that set a limit for the number of rows to fetch in the exemplary test. If the client application had issued this stored procedure call in the production environment, they would normally process every row in the result set.

For each Result Set, the system may provide properties of the result sets and the actual rows of data. At the end, the system may display the maximum return-code it encountered, and then displays the end-of-program message.

An embodiment of the present invention may process a control file that contains tests for multiple different stored procedures, as identified by Input 410. In this example, the Tool may process stored multiple procedures: CIFSP028 and CIFSP305 by reading parameter records, at 412. For example, the Tool may test stored procedure CIFSP028 (at 414) and fetch up to 20 rows from the result set(s), if available.

In the case of the CIFSP028 example, the PARMVALUE parameter values correspond to the following:

| FEN_ID | CHAR(02) |
|---|---|
| RESP_TYPE | CHAR(04) |

The Tool may receive a second input that identifies a second stored procedure CIFSP305. In this example, the Tool may fetch up to 20 rows from the result set(s), if available.

In the case of the CIFSP305 example above, the PARMVALUE parameter values correspond to the following:

| FEN_ID | CHAR(02) |
|---|---|
| RESP_TYPE | CHAR(04) |

The Tool may start with the first stored procedure CIFSP028. The Tool may start off by displaying the PARMSTART, PARMVALUE, AND PARMEND entries as they appear in the card member.

For stored procedure CIFSP028, the IN/INOUT parameters before calling the stored procedure may be displayed at 416. These input parameter values are passed into the stored procedure, at 418. The INOUT/OUT parameters after calling the stored procedure may be displayed at 420. The output parameter values are returned by the stored procedure. Also shown is the total number of rows that exist in the result set, represented by 422.

Also, the calling application may make use of a count (RESP_RS1_COUNT) to know how many rows to expect in the result set. Output parameter counters such as this are frequently evaluated before the calling program begins to fetch rows from the result set(s).

For result sets, the Tool may provide PROPERTIES OF R/S 00001: BUMP_CSR text at 424. The Tool may display in chart (or other format) attributes of each column returned in the result set. In this example, this particular result set has six columns. The column names and other useful properties may be displayed. Providing this chart to another application is a useful validation tool early in development.

The Tool may identify that the stored procedure has one result set. It may process the result set and fetch the specified number of rows. In this case, the first result set is named "BUMP_CSR" (this is its name in the stored procedure). The columns from each fetched row are displayed.

As the system processes each column from the row it fetched, it may format the data based on its DB2 data type. For example, if the result set were to contain a column defined as DECIMAL(13,2), then the program may display it as either positive or negative and with the decimal point in the right place.

The Tool may process a second and other subsequent stored procedure in a similar manner.

Other embodiments, uses, and advantages of the invention will be apparent to those skilled in the art from consideration of the specification and practice of the invention disclosed herein. The specification and examples should be considered exemplary only, and the scope of the invention is accordingly not intended to be limited thereby.

While the exemplary embodiments described herein may show the various embodiments of the invention (or portions thereof) collocated, it is to be appreciated that the various components of the various embodiments may be located at distant portions of a distributed network, such as a local area network, a wide area network, a telecommunications network, an intranet and/or the Internet, or within a dedicated object handling system. Thus, it should be appreciated that the components of the various embodiments may be combined into one or more devices or collocated on a particular node of a distributed network, such as a telecommunications network, for example. As will be appreciated from the following description, and for reasons of computational efficiency, the components of the various embodiments may be arranged at any location within a distributed network without affecting the operation of the respective system.

Data and information maintained by a Processor may be stored and cataloged in a Database which may comprise or interface with a searchable database. The database may comprise, include or interface to a relational database. Other databases, such as a query format database, a Standard Query Language (SQL) format database, a storage area network (SAN), or another similar data storage device, query format, platform or resource may be used. The database may comprise a single database or a collection of databases, dedicated or otherwise. In one embodiment, the database may store or cooperate with other databases to store the various data and information described herein. In some embodiments, the database may comprise a file management system, program or application for storing and maintaining data and information used or generated by the various features and functions of the systems and methods described herein. In some embodiments, the database may store, maintain and permit access to participant information, transaction information, account information, and general information used to process transactions as described herein. In some embodiments, the database is connected directly to the Processor, which, in some embodiments, it is accessible through a network, such as a communication network, for example.

Communications network may be comprised of, or may interface to any one or more of, the Internet, an intranet, a Personal Area Network (PAN), a Local Area Network (LAN), a Wide Area Network (WAN), a Metropolitan Area Network (MAN), a storage area network (SAN), a frame relay connection, an Advanced Intelligent Network (AIN) connection, a synchronous optical network (SONET) connection, a digital T1, T3, E1 or E3 line, a Digital Data Service (DDS) connection, a Digital Subscriber Line (DSL) connection, an Ethernet connection, an Integrated Services Digital Network (ISDN) line, a dial-up port such as a V.90, a V.34 or a V.34bis analog modem connection, a cable modem, an Asynchronous Transfer Mode (ATM) connection, a Fiber Distributed Data Interface (FDDI) connection, or a Copper Distributed Data Interface (CDDI) connection.

Communications network may also comprise, include or interface to any one or more of a Wireless Application Protocol (WAP) link, a General Packet Radio Service (GPRS) link, a Global System for Mobile Communication (GSM) link, a Code Division Multiple Access (CDMA) link or a Time Division Multiple Access (TDMA) link such as a cellular phone channel, a Global Positioning System (GPS) link, a cellular digital packet data (CDPD) link, a Research in Motion, Limited (RIM) duplex paging type device, a Bluetooth radio link, or an IEEE 802.11-based radio frequency link. Communications network 107 may further comprise, include or interface to any one or more of an RS-232 serial connection, an IEEE-1394 (Firewire) connection, a Fibre Channel connection, an infrared (IrDA) port, a Small Computer Systems Interface (SCSI) connection, a Universal Serial Bus (USB) connection or another wired or wireless, digital or analog interface or connection.

In some embodiments, communication network may comprise a satellite communications network, such as a direct broadcast communication system (DBS) having the requisite number of dishes, satellites and transmitter/receiver boxes, for example. Communications network may also comprise a telephone communications network, such as the Public Switched Telephone Network (PSTN). In another embodiment, communication network may comprise a Personal Branch Exchange (PBX), which may further connect to the PSTN.

In some embodiments, the processor may include any terminal (e.g., a typical personal computer system, telephone, personal digital assistant (PDA) or other like device) whereby a user may interact with a network, such as communications network, for example, that is responsible for transmitting and delivering data and information used by the various systems and methods described herein. The processor may include, for instance, a personal or laptop computer, a telephone, or PDA. The processor may include a microprocessor, a microcontroller or other general or special purpose device operating under programmed control. The processor may further include an electronic memory such as a random access memory (RAM) or electronically programmable read only memory (EPROM), a storage such as a hard drive, a CDROM or a rewritable CDROM or another magnetic, optical or other media, and other associated components connected over an electronic bus, as will be appreciated by persons skilled in the art. The processor may be equipped with an integral or connectable cathode ray tube (CRT), a liquid crystal display (LCD), electroluminescent display, a light emitting diode (LED) or another display screen, panel or device for viewing and manipulating files, data and other resources, for instance using a graphical user interface (GUI) or a command line interface (CLI). The processor may also include a network-enabled appliance, a browser-equipped or other network-enabled cellular telephone, or another TCP/IP client or other device.

The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above in the flowcharts. Such a set of instructions for performing a particular task may be characterized as a program, software program, or simply software.

The embodiments of the present inventions are not to be limited in scope by the specific embodiments described herein. For example, although many of the embodiments disclosed herein have been described with reference to identifying events and communicating notification, the principles herein are equally applicable to other applications. Indeed, various modifications of the embodiments of the present inventions, in addition to those described herein, will be apparent to those of ordinary skill in the art from the foregoing description and accompanying drawings. Thus, such modifications are intended to fall within the scope of the following appended claims.

Further, although the embodiments of the present inventions have been described herein in the context of a particular implementation in a particular environment for a particular purpose, those of ordinary skill in the art will recognize that its usefulness is not limited thereto and that the embodiments of the present inventions can be beneficially implemented in any number of environments for any number of purposes. Accordingly, the claims set forth below should be construed in view of the full breadth and spirit of the embodiments of the present inventions as disclosed herein.

The invention claimed is:

1. A computer implemented system that implements a batch stored procedure tool, the system comprising:
a memory component that stores control file data;
an interactive interface that receives a batch input;
a processor, coupled to the memory component and the interactive interface, the processor configured to perform the steps comprising:
access a control file from the memory component, wherein the control file comprises a list of stored procedures for batch testing and a plurality of test cases;
identify and retrieve an identifier associated with a stored procedure in the control file, wherein the stored procedure represents a compiled program that executes one or more SQL statements;
dynamically build a parameter list corresponding to the identifier and associated with the stored procedure wherein the parameters in the parameter list include one or more of a request type, account number, and response type;
access, using the parameter list, one or more of a set of associated parameter values, properties, and key data;
execute the stored procedure using the dynamically built parameter list;
identify corresponding one or more result sets wherein the format of the result sets include one or more of charts, interactive graphics, and text files; and
display, via the interactive interface, stored procedure results and the one or more result sets.

2. The computer implemented system of claim 1, wherein the memory component is a remote database.

3. The computer implemented system of claim 1, wherein the batch stored procedure tool is implemented in a mainframe environment.

4. The computer implemented system of claim 1, wherein the interface displays result set properties corresponding to the one or more result sets.

5. The computer implemented system of claim 1, wherein the interface retrieves a subset of rows from the one or more result sets.

6. The computer implemented system of claim 1, wherein the processor automatically builds an audit trail that identifies parameters used by the stored procedure and corresponding parameter values.

7. The computer implemented system of claim 1, wherein the interface provides a set of input parameters and a set of output parameters.

8. The computer implemented system of claim 1, wherein the stored procedure retrieves a name and an address for an account number.

9. The computer implemented system of claim 1, wherein the control file comprises a list of a plurality of stored procedures to be tested.

10. The computer implemented system of claim 1, wherein at least one value associated with a parameter on the parameter list is input by a user.

11. A computer implemented method that implements a batch stored procedure tool, the method comprising the steps of:
- accessing a control file from the memory component, wherein the memory component that stores control file data, and wherein the control file comprises a list of stored procedures for batch testing and a plurality of test cases;
- identifying and retrieving, via a processor, an identifier associated with a stored procedure in the control file, wherein the stored procedure represents a compiled program that executes one or more SQL statements;
- dynamically building a parameter list corresponding to the identifier and associated with the stored procedure wherein the parameters in the parameter list include one or more of a request type, account number, and response type;
- accessing, using the parameter list, one or more of a set of associated parameter values, properties, and key data;
- executing, via a processor, the stored procedure using the dynamically built parameter list;
- identifying corresponding one or more result sets wherein the format of the result sets include one or more of charts, interactive graphics, and text files; and
- displaying, via an interactive interface, stored procedure results and the one or more result sets, wherein the processor is coupled to the memory component and the interactive interface.

12. The computer implemented method of claim 11, wherein the memory component is a remote database.

13. The computer implemented method of claim 11, wherein the batch stored procedure tool is implemented in a mainframe environment.

14. The computer implemented method of claim 11, wherein the interface displays result set properties corresponding to the one or more result sets.

15. The computer implemented method of claim 11, wherein the interface retrieves a subset of rows from the one or more result sets.

16. The computer implemented method of claim 11, further comprising the step of:
- automatically building an audit trail that identifies parameters used by the stored procedure and corresponding parameter values.

17. The computer implemented method of claim 11, wherein the interface provides a set of input parameters and a set of output parameters.

18. The computer implemented method of claim 11, wherein the stored procedure retrieves a name and an address for an account number.

19. The computer implemented method of claim 11, wherein the control file comprises a list of a plurality of stored procedures to be tested.

20. The computer implemented method of claim 11, wherein at least one value associated with a parameter on the parameter list is inputted by a user.

* * * * *